United States Patent Office 3,248,403
Patented Apr. 26, 1966

3,248,403
ALPHA, OMEGA-BIFUNCTIONAL POLYTHIO-
METHYLENE COMPOUNDS
Klaus A. Saegebarth and John J. Verbanc, Wilmington,
Del., assignors to E. I. du Pont de Nemours and Company, Wilmington, Del., a corporation of Delaware
No Drawing. Filed Mar. 27, 1962, Ser. No. 182,916
1 Claim. (Cl. 260—348)

This invention relates to novel polythiomethylene compounds. Included in this class of compounds are alpha, omega-bifunctional polythiomethylene compounds having specifically segemented thioether units.

It is an object of this invention to provide novel polythiomethylene compounds. A further object is to provide novel alpha, omega-bifunctional polythiomethylene compounds. Still another object is to prepare a relatively low molelular weight compound to be used as a chemical intermediate. Other objects will appear hereinafter. These and other objects of this invention are accomplished by providing polythiomethylene sulfides which are members of the group consisting of (A)
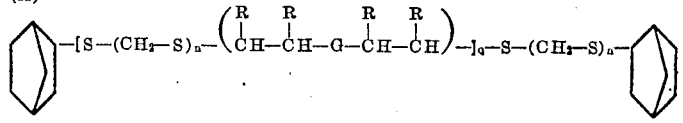

and (B)
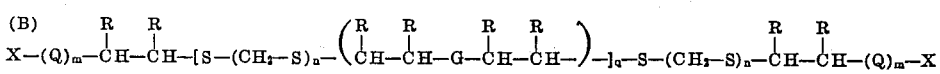

where R is selected from a member of the group consisting of hydrogen, fluorine, iodine, chlorine, bromine, alkoxy, alkyl, cycloalkyl, phenyl, phenyl substituted by alkyl, phenyl substituted by alkoxy, phenyl substituted by halogen, phenyl substituted by aryloxy, phenyl substituted by cyano, phenyl substituted by carbalkoxy and when taken together the adjacent R's can form a cyclic ring structure preferably of 4 to 6 carbon atoms with the proviso that when the adjacent R's are not taken together at least one adjacent R must be hydrogen, the preferred substituents for R being hydrogen and a $C_1$—$C_6$ alkyl radical; X is selected from a member of the group consisting of hydrogen, hydroxy, cyano,

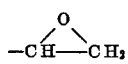

isocyanato, chlorine, phenyl, hydrocarboaryl,

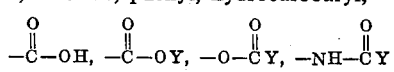

and —OY where Y is alkyl and preferably a lower alkyl; Q is selected from the group consisting of alkylene, oxaalkylene, aralkylene, arylene, arylene substituted by members selected from the group consisting of alkoxy, halogen, cyano, and carbalkoxy, although Q is preferably selected from the lower alkylenes and oxaalkylenes; $m$ is a cardinal number of from 0 to 1 inclusive; $n$ is at least two and indicates that $(CH_2S)_n$ has a number-average molecular weight of about 93–316; the average value of $n$ is generally 2 to 6.9; G is a bivalent organic radical containing no more than 18 carbon atoms selected from the group consisting of alkylene, oxaalkylene and phenylene; and $q$ is a cardinal number including 0, with the proviso that when $q$ exceeds zero, it indicates a number-average molecular weight up to 5000 for said polythiomethylene sulfides. Preferably the molecular weight is not higher than about 2000.

The simplest compounds of the present invention are those compounds (A) and (B) for which $q=0$ and $m=0$. They can be represented by the formulas (1)
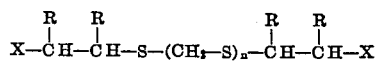

and (2)

$$X-\overset{R}{\underset{|}{C}}H-\overset{R}{\underset{|}{C}}H-S-(CH_2-S)_n-\overset{R}{\underset{|}{C}}H-\overset{R}{\underset{|}{C}}H-X$$

where the radicals X and R and integer $n$ have the same meanings as before; the $(CH_2-S)$ units are joined by carbon-sulfur bonds. The reaction of 2 mols of an oxide

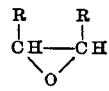

where the radical R has the same meaning as before, with one mole of an alpha, omega-mercapto-terminated polythiomethylene compound (3) $H-S(CH_2-S-)_nH$ yields a bifunctional hydroxyl-terminated compound where X equals OH. The free-radical catalyzed addition of 2 mols of 2-norbornene to the above-described polythiomethylene compound (3) yields compound (1). The free radical catalyzed addition of 2 mols of a vinyl compound

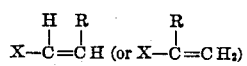

where X equals —H or

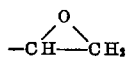

and R has the same meaning as before, to the above-described polythiomethylene compound (3) yields the corresponding compounds where X equals —H or

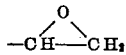

The base catalyzed addition of 2 mols of a vinyl compound

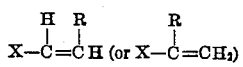

where X equals —C≡N or $$-\overset{O}{\underset{\|}{C}}-OY$$

to the above-described polythiomethylene compound yields the corresponding compounds where X equals —C≡N or

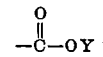

and Y is as previously defined; compounds such as ammonia, piperidine, ammonium acetate are suitable bases.

A second class of compounds of the present invention includes those compounds B for which $q=0$ and $m=1$. They can be represented by the formula (4)
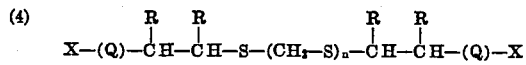

where the radicals X, Q and R and the integer $n$ have the same meanings as before and the ($CH_2$—S—) units are joined by carbon-sulfur bonds. These compounds are made by the free-radical catalyzed addition of about 2 mols of an olefin

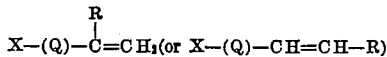

with one mole of the above-described mercapto-terminated polythiomethylene compound (3).

A third class of compounds of the present invention includes those compounds (A) and (B) in which $q$ is at least 1 and $m=0$. They can be represented by the formulas (5)
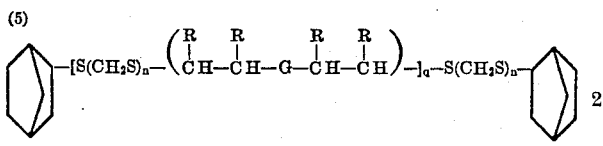

(6)
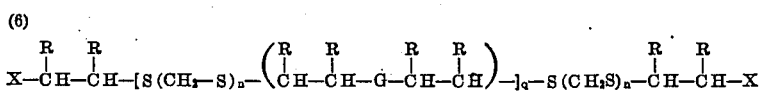

The bracket units and the ($CH_2S$) units are each joined by carbon-sulfur bonds. The compounds (6) wherein X is a hydroxyl radical are made by reacting about 2 moles of the oxide

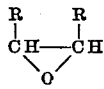

with one mole of the mercapto-terminated addition product, (7)
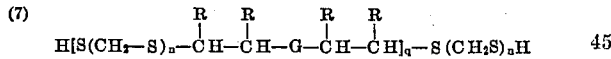

prepared by the free radical catalyzed addition of a molar excess of the mercapto-terminated polythiomethylene compound HS—($CH_2$—S)$_n$H with a non-conjugated diene having the formula

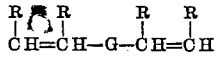

and a non-conjugated diene

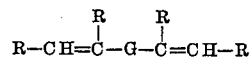

Compounds (5) can be made by reacting about 2 moles of 2-norbornene with one mole of compound (7); alternatively they can be made by the free radical catalyzed reaction of a mercapto-terminated polythiomethylene compound HS—($CH_2$—S)$_n$H, 2-norbornene, and a non-conjugated diene

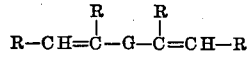

One selects the proportions of non-conjugated diene, olefin, and polythiomethylene compound such that the value of the molar ratio of polythiomethylene compound to diene is greater than 1.0 (generally between 1.0 and about 2.0) and the sum of the moles of C=C present in the diene and the olefin is at least equal to the total moles of —SH groups in the HS—($CH_2$—S)$_n$H compound. The reaction can be carried out in 1 or more steps. All the reactants can be present at the start; alternatively, the diene can be reacted with a molar excess of the polythiomethylene compound to form the intermediate. One then adds enough monoolefin to supply at least one C=C group for every —SH group in the intermediate.

The compounds (6) of the third class wherein X is —C≡N or

are made by reacting the above-described intermediate compound (7) with 2 mols of a vinyl compound

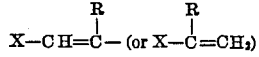

where X equals —C≡N or

in the presence of catalytic amounts of ammonia or piperidine or ammonium acetate.

A fourth class of compounds of the present invention includes those compounds (B) in which $q$ is at least 1 and $m=1$. They can be represented by the formula

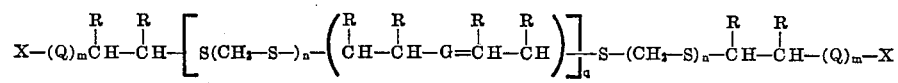

where R and G have the above-described meanings. The compounds (6) wherein X is H— or

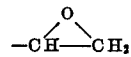

are made by the free radical catalyzed reaction of a mercapto-terminated polythiomethylene compound $$HS—(CH_2—S)_nH$$

a vinyl compound

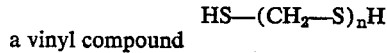

where X equals H— or

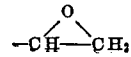

where the radicals X, R, Q, and G and the integers $n$ and $m$ have the same meanings as before. The bracket units and the (—$CH_2$—S) units are each joined through carbon-sulfur bonds. These compounds are made by the free radical catalyzed reaction of the mercapto-terminated polythiomethylene compound HS—($CH_2S$)$_n$H with the olefin

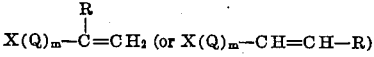

and the non-conjugated diolefin

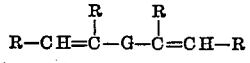

A valuable class of compounds of the present invention are the diisocyanates made by addition to isocyanato olefins. Representative examples of these olefins are described in U.S. Patents 2,326,287; 2,468,713; 2,503,209;

2,727,070. Examples 13 and 14 which follow depict other representative isocyanato monoolefins.

The reaction of the oxide with the mercapto-terminated polythiomethylene compound HS—(CH$_2$—S)$_n$H (or the polythiomethylene/non-conjugated diene intermediate) does not require a solvent but one can be employed, if desired. The operating temperature needed for best results will vary with the nature of the oxide. One skilled in the art can readily determine what the most advantageous temperature should be. In general, temperatures above about 200° C. are avoided because some thermal decomposition of the HS—(CH$_2$—S)$_n$H compound occurs. Ethylene and propylene oxides, two representative oxides, give good results at 80 and 100° C., respectively, when reacted for 8 hours in a nickel-lined bomb at superatmospheric pressure. Superatmospheric pressure is recommended when the operating temperature is well above the oxide boiling point, however, high-boiling reaction mixtures can be operated at atmospheric or even subatmospheric pressure at the option of those skilled in the art. The reactor lining can be made of nickel, stainless steel, or glass.

Alpha, α'-azobisisobutyronitrile is a preferred catalyst for the free-radical type reactions mentioned above. However, those skilled in the art may select any of the conventional dialkyl peroxides, diacyl peroxides, substituted azoacetonitriles, tert-alkyl hydroperoxides, and the like. Since the half-life for the thermal decomposition of each of these catalysts is a function of the temperature, those skilled in the art will select a reaction temperature at which the catalyst is known to decompose at a convenient rate. The following catalysts are offered as merely illustrative; the temperature at which the half-life is on hour is given inside the parentheses: trichloroacetyl peroxide (10° C.); heptafluorobutyryl peroxide (35° C.); α,α'-azobis (α,γ,γ-trimethyl valeronitrile) (45° C.); α,α'-azobis (α,γ-dimethylvaleronitrile) (68° C.); lauroyl peroxide (in benzene, 79° C.); α,α'-azobisisobutyronitrile (82° C.); potassium persulfate (in water 87° C.); acetyl peroxide (in toluene, 89° C.); bis(p-chlorobenzoyl) peroxide (93° C.); benzoyl peroxide (in benzene, 95° C.); azodicylohexane carbonitrile (105° C.); tert-butyl peracetate (in benzene, 123° C.); dicumyl peroxide (in dodecane, 138° C.); di-tert-butyl peroxide (vapor phase 150° C.). When desired, mixtures of free radical catalysts may be used. One can employ ultraviolet radiation in place of these catalysts.

In general about 0.0005 to 0.1 mole of catalyst is used for every mole of —SH groups; a convenient concentration is about 0.002–0.03 mole. When the —SH addition to a $$-\overset{|}{C}=\overset{|}{C}-$$

site occurs by a radical chain mechanism as it does here, a stoichiometric supply of catalyst is not needed. The free radical catalyst concentration should not be too high in order to avoid consumption of substantial amounts of olefin or diolefin by the free radical of the catalyst which can lead to incorporation of catalyst fragments into the product by competing with the desired chain propagation reaction. One skilled in the art can readily determine the catalyst concentration which will give a convenient rate.

The free radical reactions are usually carried out in an inert solvent for convenience of stirring etc. However, a solvent is not necessary. By inert solvent is meant any conventional solvent for a free radical reaction; the inert solvent does not interfere with the desired course of the reaction. Representative examples of suitable inert solvents include benzene, saturated aliphatic hydrocarbons such as cyclohexane, petroleum ether, and n-octane, alkyl primary alcohols such as methanol, ethanol, n-butanol, and isoamyl alcohol and mixtures such as n-hexane-ethanol. The solvents and proportions of solvents convenient for a particular set of reactants can readily be determined. By way of illustration, solutions containing about 15 to 40 grams of reactants per 100 grams of benzene have been very satisfactory.

The free radical catalyzed reactions can be carried out at atmospheric, superatmospheric, or even subatmospheric pressure. Those skilled in the art can readily determine the pressure best suited for operating convenience; for example, when the reaction mixture boils at a temperature below the operating temperature, it may be desirable to use pressure vessels such as autoclaves or bombs. The reaction vessel lining can be any material (such as glass, stainless steel, or nickel) which does not affect the desired course of the reaction.

The mercapto-terminated polythiomethylene compounds which are used as starting materials for preparing the compounds of this invention have number-average molecular weights ranging from about 126 to about 350. They are prepared by a process which comprises: (1) reacting 1.75 to 10 moles of hydrogen sulfide as a liquid with one mole of formaldehyde at superatmospheric pressure at 40° C. to 150° C., preferably 60° C., to produce a normally liquid intermediate whose infrared absorption spectrum at about 3.95 and 3.0 microns indicates the presence of mercapto and hydroxyl groups respectively; (2) contacting said intermediate at 25 to 175° C., preferably 100° C., with an aqueous non-oxidizing mineral acid (such as 4–6 N hydrochloric or sulfuric acid) at least until the infrared absorption characteristic of the hydroxyl group disappears; and (3) recovering the bis-mercaptan thereby formed which has the structure HS(CH$_2$—S)$_n$H where $n$ is an integer of at least 2 indicating a number-average molecular weight up to about 160. Other conditions being held constant, the molecular weight of the polythiomethylene compound obtained tends to decrease as the value of the molar ratio of hydrogen sulfide to formaldehyde increases. If desired, the bis-mercaptan is contacted with water at 100° C. to increase the number-average molecular weight up to about 350. The formaldehyde can be used as an aqueous solution (such as a 37% aqueous solution stablized with 12% methanol); however, quite satisfactory results are obtained when paraformaldehyde itself is used. It is not necessary to isolate the normally liquid intermediate which results from the hydrogen sulfide-formaldehyde reaction. After it has been formed and the excess hydrogen sulfide has been removed by application of heat and vacuum, the liquid intermediate is then contacted at 25–175° C. (preferably 100° C.) with the aqueous non-oxidizing mineral acid and thereby converted to the mercapto-terminated polythiomethylene compound. The concentration of the mineral acid in the aqueous phase can vary over quite a wide range without unduly affecting the molecular weight of the mercapto-terminated polythiomethylene compound obtained. In a representative preparation, excess hydrogen sulfide is reacted with formaldehyde at 45–60° C. for 1–2 hours at pH 4–5 and the product obtained is heated with 6 M hydrochloric acid at 100° C. for 4 hours to convert it to the HS-terminated polythiomethylene compound. This product, which is heavier than water and completely water-insoluble, is drawn off from the bottom of the reaction vessel and dried conventionally (e.g. with anhydrous magnesium sulfate).

The monoolefins used in making the present compounds (B) of this invention have ethylenic unsaturation of the following type

and

—CH=CH—R

Representative examples of these monomers include alpha monoolefins having up to about 18 carbon atoms (e.g. ethylene, propylene, 1-hexene, 1-decene, 1-octadecene, 5,6,6-trimethyl-1-heptene), styrene, 4-methoxystyrene, 3-chlorostyrene, allyl alcohol, 2-methyl-2-propene-1-ol (methallyl alcohol), 10-undecene-1-ol, methyl 10-undecenoate, acrylonitrile, 4-pentene-1-carbonitrile, biallyl monoepoxide, methyl acrylate, and methyl methacrylate. In making compounds (A) 2-norbornene is employed; this compound has the structure

Representative examples of the non-conjugated hydrocarbon dienes which can be used include: 1,4-hexadiene; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; 15-ethyl-1,15-heptadecadiene; 1,5-hexadiene (biallyl); diallyl ether; and 2,5-dimethyl-1,5-hexadiene (bimethallyl).

The polythiomethylene compounds (A) and (B) of the present invention are useful at temperatures up to about 200° C. as lube oil additives in which they act both as antioxidants and as lubricity improvers. Those skilled in the art can determine the optimum concentration of a particular polythiomethylene compound needed for attaining the desired lubricity in a particular lube oil for a particular application. Concentrations of 0.001 to 10% are typical. The polythiomethylenes can be added to petroleum fuels such as diesel fuel, and heating oil to protect them from oxidation.

The polythiomethylenes (B) having reactive functional terminal groups are useful chemical intermediates as well. Thus

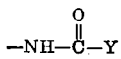

terminated polythiomethylene polymers can be reacted with molar proportions of acid anhydrides, dicarboxylic acids or carboxyl-terminated polymers to make polyamides by transamidation. The polyamides thus obtained are useful for making fibers for clothing, ropes, filter cloth, and the like and for making solid molded items such as machine parts. The —CN terminated polythiomethylene polymers can be reduced to the corresponding —NH₂ terminated polymers. The —CN groups, for example, can be catalytically hydrogenated with a nickel catalyst in the presence of ammonia. The above-described amides can be hydrolyzed to the corresponding diamines using a mixture of hydrochloric and acetic acids. The diamines can also be obtained by treating the —CN terminated polythiomethylene polymers with ethereal lithium aluminum hydride. The —NH₂ terminated polymers thus made can be reacted with monomeric organic diisocyanates, such as are described by Siefken [Ann. 562, 110–135 (1949)] or in U.S. Patents 2,728,727; 2,847,440; 2,865,940; 2,891,983; 2,963,504; 2,967,193; 2,978,476; 2,986,576. They can also be reacted with NCO-terminated polyurethanes such as polyisocyanate-terminated polyesters (U.S. Patents 2,620,516; 2,621,166; 2,729,618; French Patent 1,201,467; Australian application 20,059/53; NCO-terminated polyalkyleneether polyurethanes (U.S. Patents 2,726,219; 2,850,461; 2,901,445; 2,901,467; 2,917,489; 2,929,800; British Patents 733,624; 796,044; 797,965); NCO-terminated polyalkyleneether-thioether glycols (U.S. Patent 2,917,489; NCO-terminated castor oil-epoxy resin condensation products (U.S. Patent 2,788,-335). The

terminated polythiomethylene polymers can be hydrolyzed to the corresponding HO-terminated polythiomethylene polymers with dilute mineral acid. The

terminated polythiomethylene polymers can be reduced to the corresponding HO-terminated polymers with lithium aluminum hydride. The HO-terminated polythiomethylene polymers can be reacted with any of the above-described NCO-terminated polymers or organic polyisocyanates to make polyurethanes. Any of the NH₂- or HO-terminated polythiomethylene polymers or mixtures thereof with each other or other diamines or polyols can be used in making and curing polyisocyanate compositions. They can be used to cure liquid NCO-terminated polyalkyleneether (or polyester) polymers for encapsulating electronic equipment and making molded solid articles, fibers for cloth, films for packaging applications, calks for sealing windows and masonry and boats, and protective coatings for floors and decks and the like. Cellular products useful for fabricating crash pads, topper pads, resilient cushions, rigid insulation panels, and the like, result when gas or a gas-forming agent is incorporated for expanding the liquid mixture prior to cure. Solutions of the polyisocyanate compositions in volatile inert liquid media can be applied to substrates such as wood, glass, or steel by conventional methods such as roll coating, swabbing, or spraying. The NCO-terminated polythiomethylenes of the present invention can be substituted for part or all of the above-described polyisocyanates for any of the applications heretofore described. They can be used as adhesives for joining metal, wood, and glass members, for treating non-woven fabrics, etc.

The HO-terminated polythiomethylenes can also be reacted with molar proportions of dicarboxylic acids or anhydrides or carboxyl-terminated polymers to make polyesters. They can be reacted with polyesters to make new polyesters by transesterification. Polyesters can be used to fabricate films for packaging applications, molded parts for machinery, fibers for clothing, etc.

The

terminated polythiomethylenes can be used to make polyesters by transesterification with polyesters or with HO-terminated polythiomethylenes or with polyols such as the monomeric polyols (e.g. ethylene glycol, trimethylolpropane) described in French Patent 1,246,584 and hydroxyl-terminated polymers such as hydroxyl-terminated polyhydrocarbons (U.S. Patent 2,877,212), fatty acid triglycerides (U.S. Patents 2,833,730 and 2,787,601); hydroxyl-terminated polyformals (U.S. Patent 2,870,097); hydroxyl-terminated polyesters (U.S. Patents 2,698,838; 2,921,915; 2,591,884; 2,866,762; 2,850,476; 2,602,783; 2,729,618; 2,779,689; 2,811,493; and 2,621,166); hydroxyl methyl-terminated perfluoromethylenes (U.S. Patents 2,911,390 and 2,902,473); polyalkyleneether triols (U.S. Patent 2,866,774; Belgian Patent 582,076); polyalkyleneether glycols (U.S. Patent 2,808,391; British Patent 733,624).

The epoxide-terminated polythiomethylenes can be cured by a variety of organic reagents such as polyamines, organic anhydrides, dicarboxylic acids, amino alcohols, orthophosphoric acid, polyurethane diamines (U.S. Patent 2,888,439); they can be blended with epoxide-terminated polyalkyleneether polyurethanes (U.S. Patent 2,830,038) or the epoxy resins of U.S. Patents 2,456,408; 2,503,726; 2,615,007; 2,615,008; 2,668,807; 2,668,805; 2,698,315 or the epoxidized vegetable, animal, and fish oils as described in U.S. Patents 2,538,072; 2,581,464; and 2,712,000. The cured epoxy compounds can be used to make protective coatings for marine applications, foams for insulation and molded articles.

The following examples will better illustrate the nature of the present invention; however, the invention is not intended to be limited to these examples. Parts are by weight unless otherwise indicated.

*Example 1*

A. Four runs (*a, b, c, d*) were made with a 1-liter stainless steel bomb which was charged with paraformaldehyde (105 grams), water (100 ml.), a buffer (5 grams), and hydrogen sulfide (476 grams). In (*a*) the buffer was $H_3BO_3$; in runs (*b, c, d*) the buffer was $NaH_2PO_4$. In runs (*a*) and (*b*) the shaker tube was agitated for 8 hours at 85° C. In the remaining runs the shaker tube was heated for about one hour until heat was evolved from the reaction occurring in the shaker tube; thereafter the tube was cooled to room temperature. The polythiomethylene compound was separated from the less dense aqueous phase in a separatory funnel.

B. Two runs were made in which a 1-liter stainless steel shaker tube was purged with nitrogen and charged with a 37% formalin solution containing 12% methyl alcohol (284 grams, 3.8 moles of HCHO), sodium dihydrogen phosphate (5 grams) and hydrogen sulfide (450 grams, 13.5 moles). The tube was closed and rocked for 12 hours at 45° C. Thereafter the shaker tube was cooled to room temperature, excess hydrogen sulfide was vented off, and the bomb was opened. Its contents were transferred to a separatory funnel, the lower organic phase was separated and washed with distilled water until the washings were neutral. The organic layer was then dried over anhydrous magnesium sulfate to give a liquid polythiomethylene compound.

C. The polythiomethylene compounds prepared by procedures A and B above were combined to give 845 grams of sample. This material was stirred at 100° C. for 6 hours under a nitrogen atmosphere with concentrated hydrochloric acid (800 ml.) and boiled distilled water (1700 ml.). The layers were separated; the lower organic layer subsequently being washed with water (until neutral washings were obtained) and dried over anhydrous magnesium sulfate to yield 642 grams of mercapto-terminated polythiomethylene compound having a number-average molecular weight of about 126.

D. A 300 gram sample of the mercapto-terminated polythiomethylene compound, described in C above was placed in a 500 ml. round-bottomed flask equipped with a modified Claisen head distillation apparatus. The lowest boiling member of the polythiomethylene bis-mercaptans, methanedithiol (67 g.), was removed via vacuum distillation B.P. 20–50° C. at 0.2 to 0.3 mm., the still pot temperature was never allowed to exceed 60° C. The still heels yielded 228 g. of a mercapto-terminated polythiomethylene compound having a number-average molecular weight of about 152 (freezing point depression in benzene).

E. A 440-ml. nickel bomb was cooled in a bath of crushed solid carbon dioxide and acetone, purged with nitrogen, and charged with 30.4 grams (20 ml., 0.2 mole) of the liquid mercapto-terminated polythiomethylene compound (M.W. 152) described in D above; after 23 milliliters (19.8 grams, 0.45 mole) of ethylene oxide had been added, the bomb was flushed with nitrogen and sealed. Bomb and contents were then heated, while rocked, at 80° C. for 8 hours. After the bomb had been cooled to 25° C. and opened, an off-white to yellowish pasty solid was removed which no longer possessed a characteristic mercaptan odor. This solid was dissolved in about one liter of tetrahydrofuran and the solution decolorized with activated charcoal. After the solvent had been evaporated, drying of the residue at 100° C. at less than 0.5 mm. Hg pressure gave 43 grams (90% yield) of a pasty solid glycol, melting completely at 65° C. Its infrared spectrum indicated complete absence of the 3.95 micron mercapto band, characteristic of the starting $HS(CH_2S)_nH$; in its place a very intense 3.05 micron hydroxyl band had appeared. The number-average molecular weight of the glycol product was about 266 (based on a hydroxyl number).

F. A 1-liter stainless steel shaker tube, which had been washed with 10% nitric acid and then washed acid free with distilled water, was purged with nitrogen, charged with paraformaldehyde (105 grams, 3.5 moles), water (100 ml.), sodium dihydrogen phosphate monohydrate (5 grams), and hydrogen sufide (476 grams, 14 moles). After the shaker tube had been rocked for 8 hours at 85° C., it was cooled to room temperature (25° C.) and excess hydrogen sulfide was vented through a caustic scrubber. The shaker tube was opened and its contents were poured into a separatory funnel. The lower organic phase was drawn off and dried over anhydrous magnesium sulfate. The liquid intermediate polythiomethylene compound obtained weighed 184.7 grams and had a number-average molecular weight (freezing point depression in benzene) of 118, 119; the infrared spectrum indicated strong absorption characteristic of hydroxyl bands at 2.90, 9.80 and 10.2 microns and a strong absorption band at 3.95 microns characteristic of a mercapto group.

G. The polythiomethylene compound prepared in F above (125 grams) was stirred for 4 hours at 100° C. under a nitrogen atmosphere with concentrated hydrochloric acid (125 ml.) and boiled distiled water (250 ml.). It was then allowed to cool to room temperature under a nitrogen atmosphere. The 2-phase reaction mixture obtained was filtered to remove trithiane (30 grams) and the filtrate was transferred to a separatory funnel. The lower organic layer was washed with distilled water until the washings were neutral. The organic phase was dried over anhydrous magnesium sulfate to give 78 grams of mercapto-terminated polythiomethylene compound having a number-average molecular weight (freezing point depression in benzene) of about 199.

*Analysis.*—Found: C, 19.6; H, 4.7; S, 74.75.

H. The general procedure of step E above was repeated using 20 grams (0.1 mole) of the mercapto-terminated polythiomethylene compound prepared in G above and 17.6 grams (0.4 mole) of ethylene oxide. The glycol obtained (14 grams) had a number-average molecular weight of 260 and melted between 45–65° C. Its infrared spectrum showed hydroxyl bands present, mercapto bands absent.

I. The mercapto-terminated polythiomethylene compound (38 ml., 50 grams) prepared in step C above and 4 drops of triethanolamine were stirred together for 2 hours; the bath temperature was raised from 25° C. to 200° C. during this period. After the pressure over the mixture had been then reduced to 10 mm. Hg, the mixture was heated for an additional hour at 150° C. It was then cooled to 25° C. to give 41 grams of mercapto-terminated polythiomethylene compound having a number-average molecular weight of about 250 and melting between room temperature and 40° C.

J. The general procedure of section E above was repeated using 21 grams (0.1 mole) of the mercapto-terminated polythiomethylene compound of I above and 17.6 grams (0.4 mole) of ethylene oxide. The glycol product (31 grams, 98% yield) had a number-average molecular weight of 347 and was completely melted at 51° C. Its infrared spectrum showed hydroxyl bands present, mercapto bands absent.

*Example 2*

A. A 1-liter stainless steel shaker tube was charged with paraformaldehyde (105 grams), boiled distilled water (100 ml.), boric acid (5 grams), and hydrogen sulfide (476 grams). The shaker tube was then closed and agitated at 85° C. for 8 hours. After it had been cooled to room temperature and excess hydrogen sulfide had been vented off through a caustic scrubber, the tube was opened and the contents (203 grams) were removed and transferred to a separatory funnel. Two phases were obtained; the organic lower phase was separated and dried over anhydrous magnesium sulfate. The infrared absorption spectrum indicated that only trace amounts of HO—$CH_2$— groups were present. The mercapto-terminated polythiomethylene compound thus obtained exhibited a number-average molecular weight of 123, 125 (freezing point depression in benzene).

B. The procedure of part A above was repeated except that sodium bicarbonate (5 grams) was substituted for the boric acid. The polythiomethylene compound obtained weighed 191 grams.

C. The general procedure of part A above was repeated using a 37% formalin solution containing 12% methyl alcohol (284 grams, 3.8 moles of HCHO), sodium dihydrogen phosphate (5 grams), and hydrogen sulfide (450 grams, 13.5 moles). The polythiomethylene compound obtained after a reaction time of 12 hours at 45° C. weighed 204 grams. When the run was repeated using a reaction time of 4 hours the yield was 193 grams.

D. Six runs were made. In each case a 1-liter stainless steel bomb was used which was first purged with nitrogen and thereafter charged with 37% formalin containing 12% methanol (265 ml., 3.8 moles HCHO) and the following reagents as shown in the table:

| Run No. | Buffer (5 g.) | Conditions | Molar ratio $H_2S/H_2CO$ |
|---|---|---|---|
| 1 | $H_3BO_3$ | 45°, 4 hrs | 13.5/3.8 |
| 2 | $H_3BO_3$ | 45°, 4 hrs | 13.5/3.8 |
| 3 | $NaH_2PO_4$ | Heat to 45° then cool | 13.5/3.8 |
| 4 | No buffer | do | 13.5/3.8 |
| 5 | do | do | 6.75/3.8 |
| 6 | do | do | 3.8/3.8 |

In each case after the bomb had been purged with nitrogen gas and charged with the formalin solution and the buffer, the bomb and contents were cooled by a Dry Ice acetone bath and evacuated; thereafter the hydrogen sulfide was distilled into the bomb and collected therein. After the reaction had been completed the bomb was cooled to room temperature, excess hydrogen sulfide was vented off, the bomb was opened and the contents therein were transferred to a separatory funnel. The lower organic phase was separated, washed with distilled water until the washings were neutral, and thereafter dried over anhydrous sodium sulfate. The products obtained had the following characteristics:

| Run No. | Yield (g.) | M.W. | SH/OH |
|---|---|---|---|
| 1 | 194 | 136, 137 | 1.32 |
| 2 | 209 | 124 | 1.75 |
| 3 | 204 | 126 | 1.44 |
| 4 | 194 | 135, 137 | 0.87 |
| 5 | 200 | 133, 135 | 1.02 |
| 6 | 167 | 155, 157 | 0.75 |

E. The samples of liquid polythiomethylene compounds prepared in all the procedures (A–D) described above were combined (1423 grams) and heated while rapidly stirred at 100° C. for 6 hours under a nitrogen atmosphere with concentrated hydrochloric acid (1000 ml.) and boiled distilled water (2000 ml.). After the reaction mixture had been allowed to cool to room temperature (25° C.), the mixture was filtered to remove trithane. The filtrate was transferred to a separatory funnel. The organic lower layer which separated was drawn off and washed with distilled water until the washings were neutral; thereafter it was dried over anhydrous magnesium sulfate and fitlered. The oily mercapto-terminated polythiomethylene compound E thereby obtained weighed 1090 grams and exhibited a number-average molecular weight (freezing point depression in benzene) of about 155 indicating a degree of polymerization of 2.63.

F. Thirty-one grams (0.2 mole) of the mercapto-terminated polythiomethylene compound having a number-average molecular weight of about 155 was reacted with 29 grams (0.5 mole) of propylene oxide by the same procedure as described in Example 1E for ethylene oxide except that the charge was heated at 100° C. for 8 hours. (The higher temperature was required for complete reaction; at 80° C. some mercapto groups remained unreacted.) Forty-five grams (84% yield) of glycol were obtained melting between room temperature and 60° C. Its infrared spectrum showed a strong 2.90 micron hydroxyl band; mercapto group absorption was absent. The number-average molecular weight (by hydroxyl number) of the glycol was 305.

*Example 3*

A. In a dry nitrogen purged 1-liter four-necked flask, equipped with a stirrer, thermometer, and condenser and provided with a nitrogen blanket, was placed a solution of 77.5 grams (0.5 mole) of liquid mercapto-terminated polythiomethylene compound

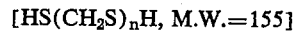
[$HS(CH_2S)_nH$, M.W.=155]

prepared by the procedure of Example 2E, and 87.0 grams (1.5 moles) of freshly distilled allyl alcohol in 500 milliliters of dry benzene. After the solution had been heated under nitrogen to 60° C., 0.5 gram (0.0031 mole) of $\alpha,\alpha'$-aozbis isobutyronitrile was added. The clear solution obtained was heated under reflux (78–81° C.) for 4–7 hours. The reaction mixture was then allowed to cool to room temperature. Solvent was removed under reduced pressure and the residual glycol

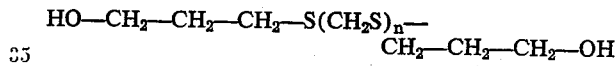
HO—$CH_2$—$CH_2$—$CH_2$—$S(CH_2S)_n$—
$CH_2$—$CH_2$—$CH_2$—OH obtained was dried at 100° C. and 0.5 mm. for 6–8 hours. Yield 130 g. (96%), M.P. 40–50° C. Hydroxyl number: 399, 401, molecular weight=280.5. An infrared spectrum exhibited an intense 3.05 micron hydroxyl absorption; absorption in the neighborhood of 4 microns (—SH region) was absent.

B. A mixture of 105 g. (3.5 moles) of paraformaldehyde, 100 ml. of water, 5 g. of boric acid and 476 g. (14 moles) of hydrogen sulfide was placed in a one liter stainless steel bomb. The bomb and contents were heated with rocking, at 85° C. for 8 hours. The $H_2S$ was vented off and the two-phase liquid product collected. The lower organic phase (203 g.) was separated and dried over anhydrous magnesium sulfate. Vacuum distillation through a 3-meter spinning band column gave:

| | | B.P., °C. (mm. Hg) | Gram |
|---|---|---|---|
| (1) | $HSCH_2SH$ | 50–51 (50 mm.) | 49.2 |
| (2) | $HSCH_2SCH_2SH$ | 52–56 (0.5–0.6) | 52.4 |
| (3) | Center cut | 80–108 (0.6–0.8) | 47.5 |
| (4) | $HSCH_2SCH_2SCH_2SH$ | 109–116 (0.7–0.8) | 23.4 |
| (5) | Still residue | | 25.0 |
| | | | 197.5 |

The general procedure of Part A above was repeated using 11.6 grams (0.2 mole) of allyl alcohol, 12.6 grams (0.1 mole) of bis(mercaptomethyl)sulfide having a number-average molecular weight of 126 (fraction 2 above boiling 52–56° C. at 0.5–0.6 mm. Hg) and 150 milliliters of benzene. The glycol (16 g., 80% yield) obtained had a number-average molecular weight of 212–224, and melted at 66–68.5° C.

*Analysis.*—Calc.: C, 39.6; H, 7.5; S, 39.7. Found: C, 39.4; H, 7.6; S, 39.9.

C. The general procedure of Part A above was repeated using 36.4 grams (0.62 mole) of allyl alcohol, 19 grams (0.076 mole) of the mercapto-terminated polythiomethylene compound having a number-average molecular weight of 250, made by the procedure of Example 1I and 250 milliliters of benzene. The glycol obtained (20 g., 94% yield) had a number-average molecular weight of 374 and melted at 85–90° C.

D. The general procedure of Part A above was repeated using 30.2 grams (0.42 mole) of methallyl alcohol, 30.4 grams (0.2 mole) of the mercapto-terminated polythiomethylene compound having a number-average molecular weight of 152 prepared according to Example 1D and 200 milliliters of benzene. The liquid glycol obtained

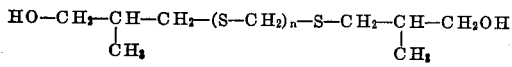

(47.7 grams, 81% yield) had a number-average molecular weight of 310. Its infrared absorption spectrum showed a strong hydroxyl band at 3.03 microns and a band at 7.25 microns characteristic of C—CH$_3$; no absorption for —SH or

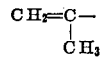

occurred.

E. The general procedure of Part A above was repeated using 17 grams (0.10 mole) of a 10-undecylenyl alcohol, 6.9 grams (0.055 mole) of bis(mercaptomethyl) sulfide having a number-average molecular weight of 126 made according to section 2B and 100 milliliters of benzene. The glycol obtained

HO—(CH$_2$)$_{11}$—S—(CH$_2$—S)$_2$—(CH$_2$)$_{11}$—OH (13 grams, 56% yield) melted at 97.5–98.5° C. (after recrystallization from benzene).

*Analysis.*—Calcd: C, 61.7; H, 10.8; S, 20.8. Found: C, 61.2; H, 10.3; S, 21.4.

F. The general procedure of Part A above was repeated using 16.8 grams (0.2 mole) of 1-hexene, 6.9 grams (0.06 mole) of bis(mercaptomethyl)sulfide having a number-average molecular weight of 126, made according to section 2B and 100 milliliters of benzene. The product obtained

CH$_3$(CH$_2$)$_5$—S(CH$_2$—S)$_2$—(CH$_2$)$_5$CH$_3$ (14.8 grams, 95% yield) was a liquid boiling above 220° C. (0.5 mm. Hg).

*Analysis.*—Calc.: C, 57.1; H, 10.3; S, 32.6 Found: C, 57.5; H, 10.2; S, 32.5.

G. The general procedure of Part A above was repeated using 21.8 grams (0.12 mole) of methyl-10-undecenoate, 6.9 grams (0.06 mole) of bis(mercaptomethyl)sulfide having a number-average molecular weight of 126, made according to section 2B and 100 milliliters of benzene. The product obtained

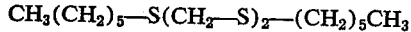

(20.6 grams, 71% yield) melted at 59–60° C. (after recrystallization from hexane).

*Analysis.*—Calc.: C, 59.8; H, 9.6; S, 18.4. Found: C, 59.2; H, 9.6; S, 18.9. The ester (5.22 grams, 0.01 mole) was added at 25° C. to 300 milliliters of ethanol containing in solution 2 grams of sodium hydroxide (0.05 mole). The resulting solution was stirred under reflux for 6 hours at atmospheric pressure. The precipitate, which appeared after the solution had been cooled to room temperature, was filtered off, washed with water, and dried. The acid obtained

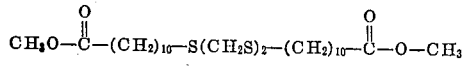

weighed 4.5 grams and melted at 116–118° C. After recrystallization from 400 milliliters of a 50/50 mixture (by volume) of ethanol and ethyl acetate, it melted at 121–121.5° C.

*Analysis.*—Calc.: C, 58.3; H, 9.4; S, 19.4 Found: C, 57.5; H, 9.5; S, 19.3.

H. A 1-liter stainless steel shaker tube was purged with nitrogen and charged with 37% formalin solution (containing 12% methyl alcohol) (265 ml., 284 grams, 3.8 moles) and hydrogen sulfide (225 grams, 6.75 moles). The shaker tube was closed, agitated and heated to 60° C. over the period of one hour and then allowed to cool to room temperature. The lower organic layer (the liquid intermediate polythiomethylene compound) was separated. Eight identical runs were made.

The liquid intermediate polythiomethylene compound prepared above (1484 grams) was rapidly stirred at 100° C. for 6 hours under a nitrogen atmosphere with concentrated hydrochloric acid (1000 ml.) and boiled distilled water (2000 ml.). After the reaction mixture had been cooled to room temperature, the white solid symmetrical trithiane (284 grams) melting at 217–218° C. which precipitated, was collected by filtration. The filtrate was transferred to a separatory funnel, the layers separated, and the lower organic layer washed with water until the washings were neutral. After the organic layer had been dried over anhydrous magnesium sulfate, the mercapto-terminated polythiomethylene compound obtained (1200 grams) exhibited a number-average molecular weight of about 161 (freezing point depression in benzene) and had an infrared spectrum showing strong SH absorption but no bands due to HO— and HO—CH$_2$— groups.

I. The general procedure of Part A above was repeated using 49 grams (0.5 mole) of biallylmonoepoxide, 32.2 grams (0.2 mole) of the mercapto-terminated polythiomethylene componud having a number-average molecular weight of 161 prepared in H above, and 250 milliliters of benzene. The diepoxide obtained

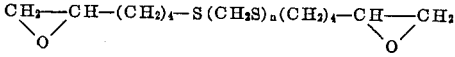

weighed 61.5 grams (86% yield). Bands characteristic of an oxirane ring were present in the infrared spectrum at 7.9 and 11.9 microns; there were no bands present characteristic of HO—, HS—, and CH$_2$=CH— groups.

*Example 4*

A. In a dry nitrogen purged 500 ml. four-necked flask, equipped with a stirrer, thermometer and condenser and provided with a nitrogen blanket, were placed 11.0 grams (0.1 mole) of 2,5-dimethyl-1,5-hexadiene, 32.2 grams (0.2 mole) of a liquid mercapto-terminated polythiomethylene compound having a number-average molecular weight of 161 made according to the procedure of Example 3H, and 250 milliliters of benzene. The resulting solution was heated to 60° C., 0.25 gram (0.0015 mole) of α,α'-azobis-isobutyronitrile was added, and the solution heated under reflux for two hours. The clear, colorless solution was then cooled to 60° C. After 0.25 gram of azo catalyst and 14.4 grams (0.2 mole) of methallyl alcohol had been added, in turn, the solution was heated under reflux (78–85° C.) for 4 hours. The reaction mixture was then allowed to cool to room temperature. After the solvent had been removed (under reduced pressure) from the clear colorless solution, the viscous liquid glycol obtained was dried at 80–100° C. (0.5 mm. Hg) for 4 hours. The product (53 grams, 92% yield) remained as a viscous liquid which became a glass at −78° C. but would not crystallize. It had a number-average molecular weight of 510.0. An infrared spectrum exhibited strong 2.93 micron hydroxyl absorption and a 7.25 micron C—CH$_3$ band; —SH and

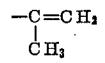

absorption bands were absent.

B. The general procedure of Part A above was repeated substituting 11.6 grams (0.2 mole) of allyl alcohol for the methallyl alcohol. The glycol obtained (53 grams, 99% yield) was a semi-solid having a number-average molecular weight of about 490 and melting to a clear liquid at 46° C. Its infrared spectrum exhibited strong absorption at 2.93 microns (OH— band) and 7.25 microns (C—CH₃ band); —SH and

absorption bands were absent.

C. The general procedure of Part A above was repeated substituting 8.2 grams (0.1 mole) of 1,5-hexadiene for the 2,5-dimethyl-1,5-hexadiene. The glycol obtained (54 grams, 96.5% yield) was a liquid at room temperature having a number-average molecular weight of 426. Its infrared absorption spectrum was consistent with its structure.

D. The general procedure of Part B above was repeated substituting 8.2 grams (0.1 mole) of hexadiene for the 2,5-dimethyl-1,5-hexadiene. The glycol obtained (36 grams, 78% yield) had a molecular weight of 558 and melted between 35–70° C. Its infrared spectrum was consistent with its structure.

E. The general procedure of Part A above was repeated using 37.8 grams (0.3 mole) of bis(mercaptomethyl)sulfide having a molecular weight of 126, made according to the procedure of section B of Example 2, 5.8 grams (0.1 mole) of allyl alcohol, 24.5 grams (0.25 mole) of diallyl ether, and 350 milliliters of benzene. The glycol product (68.0 grams, 99% yield) had a number-average molecular weight of 810 and exhibited an infrared spectrum consistent with is structure.

F. The general procedure of Part E above was repeated substituting 7.2 grams (0.1 mole) of methallyl alcohol for the allyl alcohol. The glycol made (68.8 grams, 99% yield) had a number-average molecular weight of 802 and exhibited an infrared spectrum consistent with its structure.

G. The general procedure of Part E above was repeated using 37.8 grams (0.3 mole) of bis(mercaptomethyl)sulfide, 20.5 grams (0.25 mole) of 1,5-hexadiene, and 19.8 grams of methyl 10-undecenoate. The diester obtained (79 grams, 99% yield) had a number-average molecular weight of 1198 and melted at 38–50° C. Its infrared spectrum was consistent with its structure.

*Example 5*

A dry nitrogen-swept 1-liter four-necked glass flask was used equipped with a stirrer, thermometer, condenser, and a quartz ultraviolet lamp which projected within. After 700 milliliters of methanol, 14.5 grams (0.25 mole) of allyl alcohol, and 15.5 grams (0.1 mole) of the mercapto-terminated polythiomethylene compound HS—(CH₂—S)ₙ—H having a number-average molecular weight of 155 made by the procedure of Example 2E had been introduced, the solution obtained was irradiated while agitated at room temperature (25° C.) for 24 hours. Removal of the methanol and excess allyl alcohol then gave 26 grams (96% yield) of the glycol HO—(CH₂)₃S(CH₂S)ₙ—(CH₂)₃OH having a number-average molecular weight of 292 and melting between about 40–51° C. Its infrared spectrum was identical to that of the glycol made by the procedure of Example 3A.

*Example 6*

A sample of 3-methyl-3-butenol-1 (18.9 grams, 0.22 mole, bis(mercaptomethyl)sulfide (12.6 grams, 0.1 mole), and benzene (200 ml.) were mixed together at 25° C. under a nitrogen atmosphere and thereafter heated to 60° C. After alpha,alpha'-azobis(isobutyronitrile) (0.25 gram) had been added, the mixture was stirred under reflux for 6 hours at atmospheric pressure. After the reaction mixture had been allowed to cool to room temperature, it was filtered to remove a trace of an insoluble material, and concentrated under reduced pressure. The glycol thereby obtained was a viscous oil having the structure

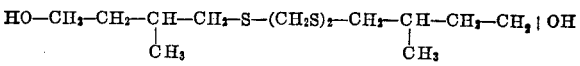

An infrared spectrum indicated an intense 2.95 micron hydroxyl band; absorption in the 4 micron region, characteristic for the SH group, was absent.

*Analysis.*—Calcd.: Hydroxyl number, 377. Found: Hydroxyl number, 362.1, 364.0.

*Example 7*

A. The mercapto-terminated polythiomethylene compound, prepared according to the procedure of Example 3H, had a number-average molecular weight of 161.

B. *Preparation of diester.*—A solution was prepared under a nitrogen atmosphere at 25° C. by adding the liquid mercapto-terminated polythiomethylene compound HS(CH₂S)ₙH, prepared in Part A above (16.1 grams, 0.1 mole) and vinyl acetate (18.9 grams, 20 ml., 0.22 mole) to benzene (250 ml.). After the solution had been heated under nitrogen to 60° C., alpha, alpha'-azobis(isobutyronitrile) (0.25 gram) was added. The clear solution obtained was heated under reflux (78–81° C.) at atmospheric pressure for 4 hours. After the reaction mixture had been cooled to room temperature, the solvent was removed under reduced pressure to yield a white waxy product weighing 34.7 grams and melting at 25 to 28° C. The diester

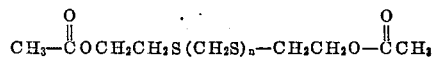

contained 37.4, 37.5% sulfur (theoretical value 36.2%).

*Example 8*

A. A 2-phase mixture of the polythiomethylene compound (155 grams, 1 mole) made in Example 2E above and boiled distilled water (1000 ml.) was heated at reflux while rapidly stirred in a 3-liter flask. A nitrogen sweep, to expel the evolved hydrogen sulfide, was maintained throughout the reaction period. After the mixture had been heated under reflux for 8 hours, it was allowed to cool while stirred. The organic lower layer was separated, washed with water, and dried in a vacuum desiccator. The liquid polythiomethylene compound (A) thereby obtained weighed 143.2 grams, melted at 40° C., and had a number-average molecular weight of about 258 (boiling point elevation of acetone).

*Analysis.*—C, 23.0, 22.8; H, 4.6, 4.5; S, 68.4. The infrared spectrum of the polythiomethylene compound (A) gave a band at 4 microns characteristic of the SH-group and a weak 3.0μ OH band.

The liquid polythiomethylene compound (A) prepared above was placed in a 2-liter resin flask equipped with a stirrer, a water-cooled condenser, a thermometer, and provided with a blanket of nitrogen. After boiled distilled water (1000 ml.) and concentrated hydrochloric acid (150 ml.) had been added, the mixture obtained was rapidly stirred at 100° C. for 6 hours. It was then cooled to room temperature while being stirred. The solid which precipitated was collected, washed with distilled water in a mortar, and dried under vacuum for 24 hours. A yield of 66.5 grams of mercapto-terminated polythiomethylene compound (B) melting at 51–55° C. was obtained. Its infrared absorption spectrum exhibited a strong band at 3.95 microns characteristic of SH group; absorption bands characteristic of the hydroxyl groups were missing. This polythiomethylene compound (B) exhibited a number-average molecular weight (freezing point depression in benzene) of about 300. The molecular weight (determined by boiling point elevation in benzene) was 334, 337.

*Analysis.*—Found: C, 23.7, 23.4; H, 4.6, 4.6; S, 72.3, 72.6.

B. The mercapto-terminated polythiomethylene compound (B) prepared in Part A above (15 grams, 0.05 mole) and N-allyl acetamide (14.9 grams, 0.15 mole) were added with stirring to dry benzene (300 ml.) and the solution thereby obtained was heated to 60° C. After alpha, alpha'-azobis-isobutyronitrile (0.5 gram) had been introduced, the mixture was stirred under reflux for five hours. When it had been allowed to cool to room temperature, a copious white precipitate was obtained which was collected by filtration, washed with cold benzene, and thereafter dried under vacuum. The diamide

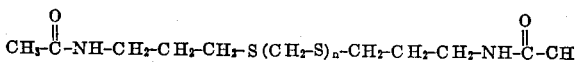

thereby obtained weighed 10.2 grams, melted at 119–136.5° C., and analyzed for 4.2% nitrogen by weight (theoretical value 5.6%).

*Example 9*

Into a dry nitrogen purged reaction flask was placed a solution of bis(mercapto methyl)sulfide (12.6 grams, 0.1 mole) and N-allyl acetamide (20.8 grams, 0.21 mole) in dry benzene (150 ml.). After the solution thereby obtained had been heated to 60° C., alpha, alpha'- azo-bis-isobutyronitrile (0.5 gram) was added; the mixture was thereafter refluxed for 2 hours at atmospheric pressure. On cooling, a copious white precipitate was obtained. The crystals were collected by conventional filtration and dried to yield 29 grams of diamide melting 114–115° C. After recrystallization from tetrahydrofuran, the compound melted 117.5–118° C.

*Analysis.*—Calcd. for $C_{12}H_{24}S_3N_2O_2$: C, 44.5; H, 7.4; S, 29.6; N, 8.6; O, 9.9. Found: C, 44.4, 44.5; H, 7.2; S, 30.1, 30.2; N, 8.86, 8.82.

*Example 10*

A. A blend (100 grams) of the mercapto-terminated polythiomethylene compounds made by the procedure of Example 1C (60.5 grams) and 1I (39.5 grams) was prepared to give a number-average molecular weight of 175. The blend gave a polythiomethylene compound having a number-average molecular weight (depression of freezing point in benzene) of 176, 178.

B. In a dry nitrogen purged reaction flask were placed the mercapto-terminated polythiomethylene compound prepared in Part A above (17.7 grams, 0.1 mole), allyl glycidyl ether (34.2 grams, 0.3 mole), and dry benzene (250 ml.). The solution was heated to 60° C., alpha, alpha'-azobis-isobutyronitrile (0.25 gram) was added, and the solution thereby obtained was heated under reflux at atmospheric pressure for 4 hours. After the solvent had been evaporated under reduced pressure, 31 grams of bis epoxide

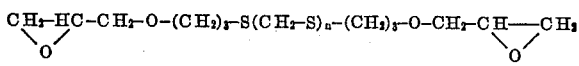

melting 29–32.5° C. was obtained.
*Analysis.*—S, 32.5%. Found: S, 33.4.

*Example 11*

Into a dry nitrogen purged reaction flask were placed the mercapto-terminated polythiomethylene compound prepared in Example 10A (17.7 grams, 0.1 mole), allyl chloride (19.1 grams, 0.25 mole) and benzene (250 ml.). After the resulting solution had been heated to 60° C., alpha, alpha'-azobis isobutyronitrile (0.5 gram) was added. The solution was heated while agitated under reflux at atmospheric pressure for 15 hours, then allowed to cool to room temperature, and concentrated under vacuum to yield 31.6 grams of a waxy solid with a slight yellow color. After this product had been dissolved in benzene (50 ml.) and passed through a 40 by 140 mm.

neutral alumina column and eluted with benzene (400 ml.), there were obtained 30 grams of the dichloride

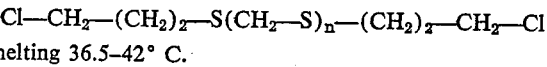

melting 36.5–42° C.
*Analysis.*—Calculated percent Cl 21.5; Found; Cl 19.9, 20.1, molecular weight (boiling point elevation in benzene) 304–306.

*Example 12*

The mercapto-terminated polythiomethylene compound, prepared in Example 10A (17.7 grams, 0.1 mole), and styrene (21.8 grams, 0.21 mole) were added to dry benzene (250 ml.) under a nitrogen atmosphere at room temperature. After the resulting solution had been heated to 60° C., alpha, alpha'-azobis isobutyronitrile (0.25 gram) was added. The mixture was stirred at reflux at atmospheric pressure for 2.5 hours, cooled to room temperature and concentrated under vacuum to yield 33.7 grams of the phenyl-terminated polythiomethylene compound

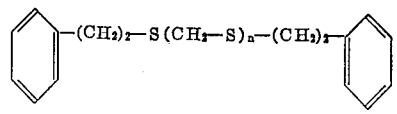

melting 28–32° C.
*Analysis.*—Calculated: S, 34.2%; Found: S, 34.5, 34.6%.

*Example 13*

A. A mixture of 2000 ml. of xylene, 1500 ml. of isoprene, 70 ml. of isocyanic acid, and 14 g. of ammonium p-toluene sulfonate is heated 3 hours at 100° C. The solid that forms in the reaction mixture is removed by filtration and the filtrate is distilled through a precision still. There is obtained 50 g. of α,α-dimethylallyl isocyanate boiling at 100–105° C. Redistillation gives α,α-dimethylallyl isocyanate boiling at 105° C. and having a refractive index $n_D^{25}$ of 1.4100. The infrared absorption spectrum exhibits bands at 2.7μ, 4.4μ, 6.μ, 7.28μ, 7.27μ, 10.15μ, and 10.85μ.

B. Bis(mercapto methyl)sulfide (6.30 grams, 0.05 mole) and alpha, alpha-dimethylallyl isocyanate (12.2 grams, 0.11 mole) were added to dry benzene (100 ml.) under a nitrogen atmosphere at 25° C. After the solution had been heated to 60° C., alpha, alpha'-azobis isobutyronitrile (0.25 gram) was introduced. The resulting mixture was then stirred under reflux for 6 hours. After the solvent had been taken off under vacuum, the residue was heated for 4 hours at 60° C. at 0.1 mm. vacuum. The isocyanate-terminated polythiomethylene compound obtained

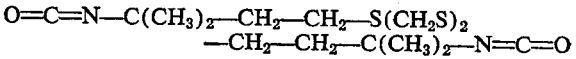

(weighing 13.7 grams) analyzed as follows:
*Analysis.*—Percent NCO: Calculated, 24.3; Found, 23.9, 23.7.

*Example 14*

A. A mixture of 3000 ml. of toluene, 350 g. p-diisopropenylbenzene, 860 g. of isocyanic acid, 14 g. of ammonium tosylate, and 7 g. of hydroquinone was heated while being agitated in an autoclave at 100–120° C. for 2 hours. After being cooled to room temperature, the reaction mixture was filtered to remove the isocyanic acid. A simple distillation of the filtrate yielded 136 g. of a volatile isocyanate mixture (B.P. 90–110° C./1 mm. Hg) along with 190 g. of nondistillable residue, shown by infrared to contain isocyanate groups. An isocyanate containing 95% of

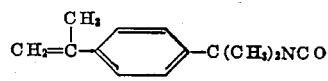

was obtained by redistillation of the volatile isocyanate.

B. A solution of bis(mercapto methyl)sulfide (6.30 grams, 0.05 mole) and the organic isocyanate

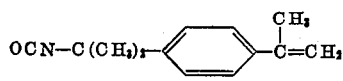

(20.1 grams, 0.1 mole) in dry benzene (100 ml.) was heated under a nitrogen atmosphere to 60° C. then alpha, alpha'-azobis isobutyronitrile (0.25 gram) was added. After the mixture had been stirred under reflux for 12 hours, it was cooled to room temperature and the solvent taken off under reduced pressure. The clear, colorless, odorless viscous residue obtained had a sulfur content of 18.5, 18.6% by weight and an NCO content of 15.1, 15.2% by weight.

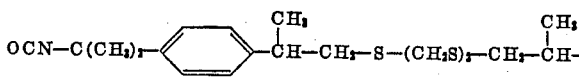

requires percent S, 18.2; percent NCO, 15.9.

*Example 15*

A solution was prepared at 25° C. under a nitrogen atmosphere by mixing ethyl vinyl ether (16.8 grams, 0.23 mole) and the mercapto-terminated polythiomethylene

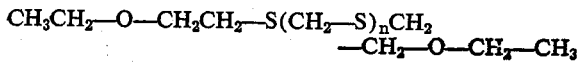

compound described in Example 10A (17.7 grams, 0.1 mole) in dry benzene (250 ml.). After the temperature had been raised to 60° C., alpha, alpha'-azobis isobutyronitrile (0.25 gram) was added. The mixture thereby obtained was refluxed at atmospheric pressure for 3.5 hours. It was then cooled to room temperature and concentrated under vacuum to yield 30.2 grams of the ether terminated polymer melting 29–33° C. and analyzed for 42.3, 42.6% by weight sulfur (calculated 41%). This compound possesses reasonable thermal stability (up to about 250° C.) and good lubricity.

$$CH_3CH_2-O-CH_2CH_2-S(CH_2-S)_nCH_2-CH_2-O-CH_2-CH_3$$

*Example 16*

Into a 500 ml. flask equipped with a stirrer, thermometer, dropping funnel, and a reflux condenser were placed acrylonitrile (65 ml.) and triethylamine (2 drops). The solution was cooled under a nitrogen atmosphere in an ice bath; 16.1 g. (0.1 mole) of the mercapto-terminated polythiomethylene compound (number-average molecular weight 161) prepared by the procedure of Example 3H, was added dropwise at a rate sufficient to maintain the temperature between 14 and 20° C. This required 22 minutes. After the unreacted acrylonitrile had been evaporated, the semi-solid residue was dissolved in methylene chloride (200 ml.); the solution was washed successively with 200-ml. portions of distilled water, a 100-ml. portion of 5% hydrochloric acid, and then with water until the washings were neutral. After the solution had been dried over anhydrous magnesium sulfate, the methylene chloride was removed under vacuum to give a pure white odorless semi-solid. The cyano-terminated polythiomethylene compound melted completely at 37° C., analyzed for 10.8, 10.9% nitrogen by weight (calculated 10.5%) and had an infrared spectrum containing an intense absorption band at 4.40 microns characteristic of the cyano group; infrared absorption at 3.95 microns, characteristic of the mercapto group, was completely absent. The dicyano compound had a molecular weight (freezing point depression in benzene) of about 240 (calculated 267).

*Example 17*

A. When 0.11 mole of

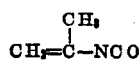

(described in U.S. Patent 2,326,287) was substituted for α,α-dimethylallyl isocyanate in the procedure of Example 13B, a diisocyanate of the following structure was obtained

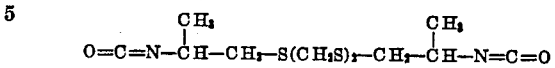

B. When 0.11 mole of CH$_2$=CH—CH$_2$—CH$_2$—NCO (described in U.S. Patent 2,326,287) was substituted for α,α-dimethylallyl isocyanate in the procedure of Example 13B, a diisocyanate of the following structure was obtained $$O=C=N-(CH_2)_4-S(CH_2S)_x-(CH_2)_4-N=C=O$$

C. When 0.11 mole of any one of the isocyanates

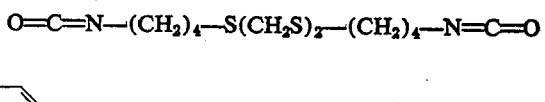

described in U.S. Patent 2,503,209 is substituted for α,α-dimethylallyl isocyanate in the procedure of Example 13B, a diisocyanate of the following structure is obtained

where A, R, and n have the meanings described in the patent.

*Example 18*

A solution of 15 g. (0.05 mole) of the mercapto-terminated polythiomethylene compound (B) (prepared in Part A of Example 8) and 11.6 g. (0.2 mole) of freshly distilled allyl alcohol in 300 ml. of dry benzene was heated to 60° C. and 0.5 g. of alpha, alpha'-azobis isobutyronitrile was added. The mixture was heated under reflux for 6 hours at atmospheric pressure. On cooling the white crystalline glycol, $$HO(CH_2)_3-S(CH_2S)_n-(CH_2)_3OH$$

where the average value of n is 5.76, separated out and was collected by filtration and dried under vacuum; yield 18.3 grams (88%), M.P. 97–115° C.

*Analysis.*—Calculated: Hydroxyl number 270; percent S, 52.0. Found: Hydroxyl number, 269.6, 271.1; percent S, 51.8, 52.0. An infrared spectrum (KBr pellet) indicated a strong 2.98μ OH band; absorption in the SH region was completely absent.

*Example 19*

The mercapto-terminated polythiomethylene compound prepared in Example 3H (16.1 grams, 0.1 mole) and 20.7 grams (0.22 mole) bicyclo (2.2.1) heptene-2 (also called 2-norbornene) were dissolved in 150 milliliters of dry benzene under a nitrogen atmosphere at room temperature.. The resulting solution was heated to 60° C. and 0.25 gram of alpha, alpha'-azobis isobutyronitrile was added. The solution was stirred at reflux at atmospheric pressure for 8 hours, cooled to room temperature and concentrated under vacuum to yield 34.6 grams (98%) of a highly viscous oil,

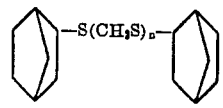

which did not crystallize on cooling to −80° C.

*Analysis.*—Calculated: M.W.=349. Found: M.W.=331 (freezing point in benzene). An infrared spectrum indicated an absence of SH absorption and the characteristic bicyclo (2.2.1)-heptane bands.

*Example 20*

In a dry nitrogen purged 440 milliliter Hastaloy bomb were placed 27.4 grams (0.155 mole) of the polythiomethylene bismercaptan (prepare in Example 10A), 100 milliliters of dry benzene, 0.25 gram alpha, alpha'-azobisisobutyronitrile and 28.0 grams (0.5 mole) of isobutylene. The bomb and contents were heated at 80° C. for 4 hours under autogenous pressure and then cooled to room temperature. The contents of the bomb was applied to a 40 x 140 millimeter neutral alumina column and eluted with 450 milliliters of benzene. Vacuum evaporation of the solvent gave 42.5 grams (98%) of the isobutyl terminated polymer,

as a low melting solid which was completely molten at 33° C.

*Analysis.*—Calculated: S, 45.0. Found: S, 45.1, 45.2. An infrared spectrum indicated the absence of an SH band.

Example 21

In a dry nitrogen purged flask were placed a solution of 17.7 grams (0.1 mole) of the mercapto-terminated polythiomethylene compound (prepared in Example 10A), 20.8 grams (0.21 mole) of N-allyl acetamide and 250 milliliters of dry benzene. The resulting solution was heated to 60° C. and 0.5 gram of α,α'-azobis isobutyronitrile was added. The solution was then stirred at reflux at atmospheric pressure for 5.5 hours and allowed to cool. The copious white crystalline precipitate which separated was collected by filtration and dried under vacuum to yield 32 grams (85%) of the diamide,

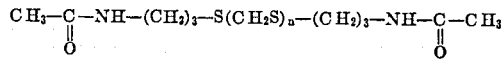

M.P. 98–123.5° C.

*Analysis.*—Calculated: percent N, 7.47; percent S, 35.2. Found: percent N, 7.54, 7.47; percent S, 35.6, 35.9.

As many widely different embodiments of this invention may be made without departing from the spirit and scope thereof, it is to be understood that this invention is not limited to the specific embodiments thereof except as defined in the appended claim.

What is claimed is:

A sulfide composition of the formula

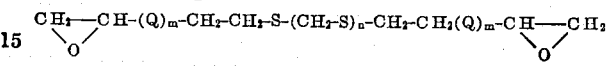

where Q is an ethylene; $m$ is one and $n$ is at least two indicating a number-average molecular weight of about 92 to 316 for the $—(CH_2—S)_n—$ radical portion of the formula.

References Cited by the Examiner

UNITED STATES PATENTS

| | | | |
|---|---|---|---|
| 2,434,099 | 1/1948 | Bousquet | 260—348 |
| 2,522,512 | 9/1950 | Harman et al. | 260—609 |
| 2,552,510 | 5/1951 | Barker et al. | 260—609 X |
| 2,562,844 | 7/1951 | Harman et al. | 260—609 X |
| 2,605,223 | 7/1952 | Case | 252—8.55 |
| 2,877,153 | 3/1959 | Webb | 260—609 |
| 2,998,346 | 8/1961 | Scott | 260—609 |

WALTER A. MODANCE, *Primary Examiner.*

NICHOLAS S. RIZZO, *Examiner.*